(12) United States Patent
Zhang et al.

(10) Patent No.: US 10,916,179 B2
(45) Date of Patent: Feb. 9, 2021

(54) DISPLAY SCREEN AND ELECTRONIC DEVICE

(71) Applicant: GUANGDONG OPPO MOBILE TELECOMMUNICATIONS CORP., LTD., Guangdong (CN)

(72) Inventors: Haiping Zhang, Guangdong (CN); Yibao Zhou, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/147,977

(22) Filed: Oct. 1, 2018

(65) Prior Publication Data

US 2019/0156729 A1 May 23, 2019

(30) Foreign Application Priority Data

Nov. 22, 2017 (CN) .......................... 2017 1 1174672

(51) Int. Cl.
*G09G 3/20* (2006.01)
*G09G 5/10* (2006.01)
(Continued)

(52) U.S. Cl.
CPC ............. *G09G 3/2092* (2013.01); *G09G 3/20* (2013.01); *G09G 5/10* (2013.01); *G06F 3/043* (2013.01); *G06F 3/0421* (2013.01); *G06F 2203/04108* (2013.01); *G09G 3/3208* (2013.01); *G09G 3/36* (2013.01); *G09G 2300/0408* (2013.01); *G09G 2300/0465* (2013.01); *G09G 2320/0261* (2013.01); *G09G 2320/0626* (2013.01); *G09G 2320/0686* (2013.01); *G09G 2330/021* (2013.01); *G09G 2330/026* (2013.01); *G09G 2330/027* (2013.01);
(Continued)

(58) Field of Classification Search
None
See application file for complete search history.

(56) References Cited

U.S. PATENT DOCUMENTS 9,484,381 B2 * 11/2016 Kurokawa ................ G01J 1/18
2006/0244693 A1 * 11/2006 Yamaguchi ......... G02F 1/13338
345/76

(Continued)

FOREIGN PATENT DOCUMENTS

CN 101739954 6/2010
CN 102957885 3/2013
(Continued)

OTHER PUBLICATIONS

EPO, Office Action for EP Application No. 18201526, dated Feb. 27, 2019.
(Continued)

*Primary Examiner* — Nicholas J Lee
(74) *Attorney, Agent, or Firm* — Hodgson Russ LLP

(57) ABSTRACT

Embodiments of the present disclosure provide a display screen and an electronic device. The display screen includes a functional area. The functional area is configured to achieve a function of the electronic device and includes a plurality of pixel points. The plurality of pixel points defines a gap area therebetween. The display screen further includes a signal emitter received in the gap area.

15 Claims, 12 Drawing Sheets

(51) Int. Cl.
*G06F 3/042* (2006.01)
*G06F 3/043* (2006.01)
*G09G 3/3208* (2016.01)
*G09G 3/36* (2006.01)

(52) U.S. Cl.
CPC .. *G09G 2340/0407* (2013.01); *G09G 2354/00* (2013.01); *G09G 2360/144* (2013.01); *G09G 2360/145* (2013.01)

(56) References Cited

U.S. PATENT DOCUMENTS

| | | | |
|---|---|---|---|
| 2007/0018915 A1* | 1/2007 | Tang | G09G 3/3225 345/76 |
| 2008/0068524 A1 | 3/2008 | Kim | |
| 2015/0242008 A1 | 8/2015 | Beckman | |
| 2015/0364107 A1 | 12/2015 | Sakariya et al. | |
| 2019/0130822 A1* | 5/2019 | Jung | H01L 51/0097 |

FOREIGN PATENT DOCUMENTS

| | | |
|---|---|---|
| CN | 106453726 | 2/2017 |
| CN | 106782085 | 5/2017 |
| CN | 106850989 | 6/2017 |
| CN | 206224518 | 6/2017 |
| CN | 106921767 | 7/2017 |
| CN | 106933427 | 7/2017 |
| CN | 206401320 | 8/2017 |
| CN | 107135341 | 9/2017 |
| CN | 107195661 | 9/2017 |
| CN | 107316885 | 11/2017 |
| CN | 107945725 | 4/2018 |
| WO | 2016084544 | 6/2016 |

OTHER PUBLICATIONS

WIPO, English translation of the ISR and WO for PCT/CN2018/110882, Jan. 16, 2019.
SIPO, First Office Action for CN Application No. 201711174672.4, dated Aug. 27, 2019.

* cited by examiner

DISPLAY SCREEN AND ELECTRONIC DEVICE

CROSS REFERENCE TO RELATED APPLICATION

The present application claims priority to Chinese Application No. 201711174672.4, filed with the State Intellectual Property Office of P. R. China on Nov. 22, 2017, the entire contents of which are incorporated herein by reference.

FIELD

The present disclosure relates to a display screen and an electronic device.

BACKGROUND

With rapid developments of electronic technology, an electronic device (such as a smart phone and a tablet computer) is more and more popular. The smart phone and the tablet computer each have a display screen.

Generally, a proximity sensor is arranged in a non-display area at an upper portion of the display screen. The proximity sensor is used to detect the approach and departure between the electronic device and the external object, so as to control the display screen of the electronic device to go out or light up.

SUMMARY

Embodiments of a first aspect of the present disclosure provide a display screen for an electronic device. The display screen includes: a functional area configured to achieve a function of the electronic device and having a plurality of pixel points, the plurality of pixel points defining a gap area therebetween; and a signal emitter received in the gap area.

Embodiments of a second aspect of the present disclosure provide an electronic device. The electronic device includes a housing and a display screen coupled to the housing. The display screen includes a plurality of pixel points, the plurality of pixel points defines a gap area therebetween, and the gap area is provided with a signal emitter therein.

Embodiments of a third aspect of the present disclosure provide another display screen. The display screen includes: a display area having a plurality of pixel points, the plurality of pixel points being spaced apart from one another so as to define a gap area therebetween; and a signal emitter and a signal receiver positioned in the gap area, the signal receiver being spaced apart from the signal emitter and communicated with the signal emitter.

BRIEF DESCRIPTION OF THE DRAWINGS

To describe technical solutions in embodiments of the present disclosure more clearly, the following will briefly introduce the accompanying drawings required for the description of the embodiments. Obviously, the accompanying drawings described below show some embodiments of the present disclosure, and those skilled in the art can obtain other drawings based on these drawings without paying creative efforts.

DETAILED DESCRIPTION

Figure 1:
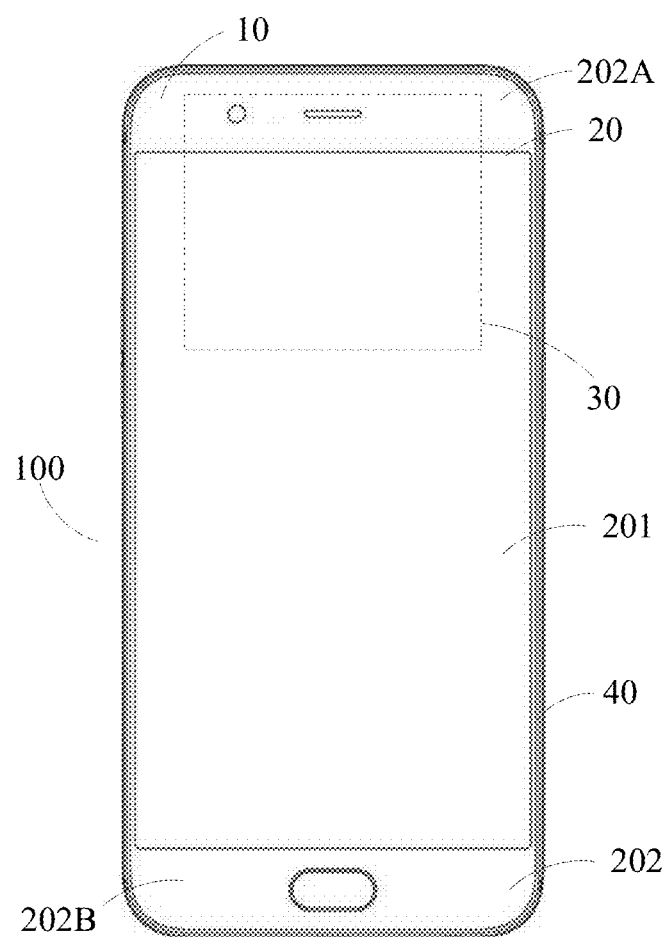
FIG. 1 is a schematic view of an electronic device according to embodiments of the present disclosure.

Technical solutions in embodiments of the present disclosure will be clearly and completely described below with reference to the accompanying drawings in the embodiments of the present disclosure. Obviously, the embodiments described herein are only a part but not all of the embodiments of the present application. Based on the embodiments of the present disclosure, all other embodiments obtained by those skilled in the art without paying creative efforts, fall into the protection scope of the present application.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise," should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance and are not intended to implicitly indicate the number of the technical feature mentioned. Thus, features limited by "first" and "second" are intended to indicate or imply including one or more than one these features. In the description of the present disclosure, "a plurality of" means two or more than two, unless specified otherwise.

In the present disclosure, unless specified or limited otherwise, the terms "mounted," "connected," "coupled" and the like are used broadly, and may be, for example, fixed connections, detachable connections, or integral connections; may also be mechanical or electrical connections; may also be direct connections or indirect connections via intervening structures; may also be inner communications of two elements or interaction relationships between two elements. The above terms can be understood by those skilled in the art according to specific situations.

In the description of the present disclosure, a structure in which a first feature is "on" or "beneath" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

The following disclosure provides many different embodiments or examples to realize different structures of the present disclosure. To simplify the disclosure of the present disclosure, components and configurations in particular examples are elaborated. Of course, they are illustrative, and are not intended to limit the present disclosure. Moreover, reference numbers and/or letters may be repeated in different examples of the present disclosure for the purpose of simplicity and clarity, which shall not be constructed to indicate the relationships among various embodiments and/or configurations. In addition, the present disclosure provides examples of various specific processes and materials, but applicability of other processes and/or utilization of other materials are conceivable for those skilled in the art.

Embodiments of the present disclosure provide an electronic device. The electronic device may include a smart phone, a tablet computer or the like. The electronic device includes a housing and a display screen coupled to the housing. The display screen includes multiple pixel points, the pixel points define a gap area therebetween, and the gap area is provided with a signal emitter therein.

FIG. 1 is a schematic view of an electronic device 100 according to embodiments of the present disclosure. As illustrated in FIG. 1, the electronic device 100 includes a cover plate 10, a display screen 20, a circuit board 30 and a housing 40.

The cover plate 10 is coupled to the display screen 20, so as to cover the display screen 20. The cover plate 10 may be a transparent glass cover plate. In some embodiments, the cover plate 10 may be a glass cover plate made of materials such as sapphire.

The display screen 20 is coupled to the housing 40, so as to provide a display surface of the electronic device 100. In some embodiments, the display screen 20 includes a display area 201 and a non-display area 202. The display area 201 is used to display information, such as images and texts. The non-display area 202 does not display information. The non-display area 202 may be used to receive some functional components.

In some embodiments, the non-display area 202 includes a first area 202A and a second area 202B, the first area 202A is arranged at an end of the display area 201, and the second area 202B is arranged at another end of the display area 201 opposite to the end where the first area 202A is. The first area 202A may receive the functional components therein, such as a camera and a telephone receiver, while the second area 202B may receive other functional components therein, such as a fingerprint identification module and a touch system circuit.

In some embodiments, the display screen 20 may not include the non-display area. In this case, the display screen 20 may achieve a full-screen display.

In some embodiments, the display screen 20 may be a liquid crystal display (LCD) screen. In other embodiments, the display screen 20 may be an organic light-emitting diode (OLED) display screen.

The circuit board 30 is received in housing 40. The circuit board 30 may be a mainboard of the electronic device 100. The circuit board 30 has a ground point for grounding of the circuit board 30. The circuit board 30 may be integrated with functional components such as the camera and a processor. Also, the display screen 20 may be electrically coupled to the circuit board 30.

In some embodiments, the circuit board 30 may be provided with a display control circuit. The display control circuit outputs an electrical signal to the display screen 20, so as to control the display screen 20 to display information.

The housing 40 is used to provide an external outline of the electronic device 100. The housing 40 may be made of materials such as plastic or metal. The housing 40 may be integrally molded.

Embodiments of the present disclosure provide a display screen. The display screen includes a display area, the display area has multiple pixel points, and the pixel points are spaced apart from one another so as to define a gap area therebetween. The display screen further includes a signal emitter and a signal receiver positioned in the gap area. The signal receiver is spaced apart from the signal emitter and communicated with the signal emitter.

Figure 2:
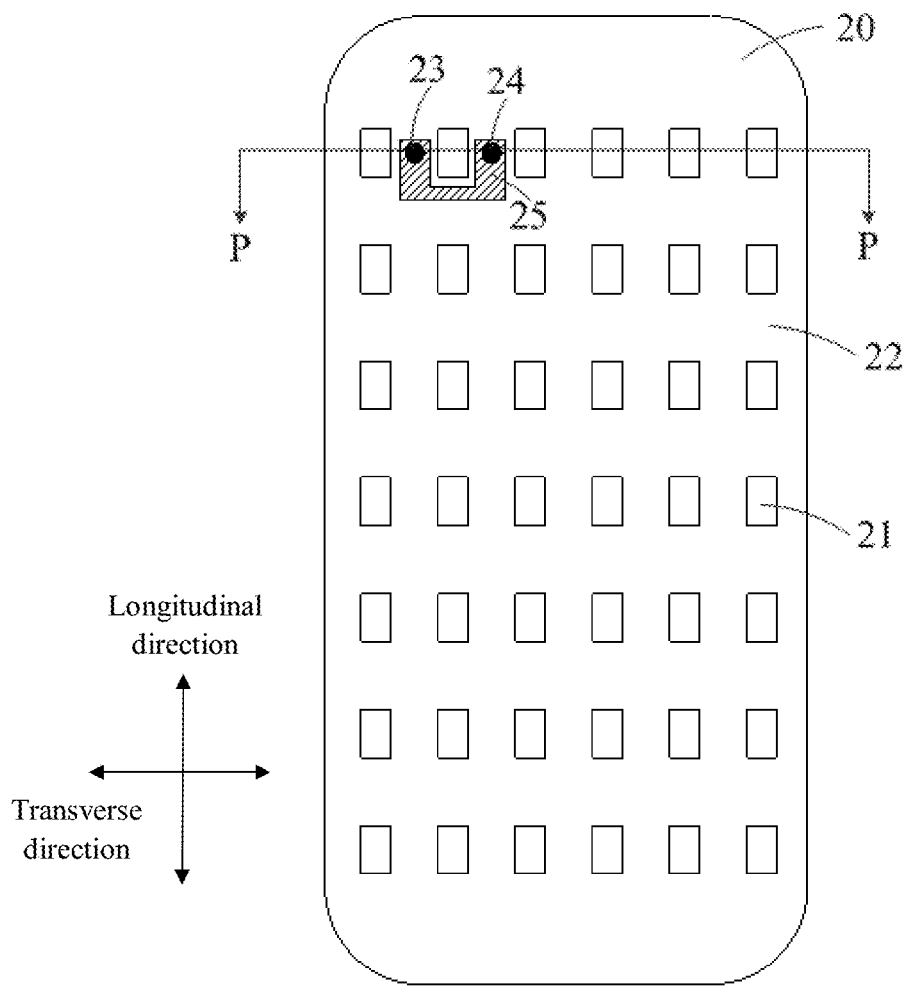
FIG. 2 is a first schematic view of a display screen according to embodiments of the present disclosure.
Figure 3:
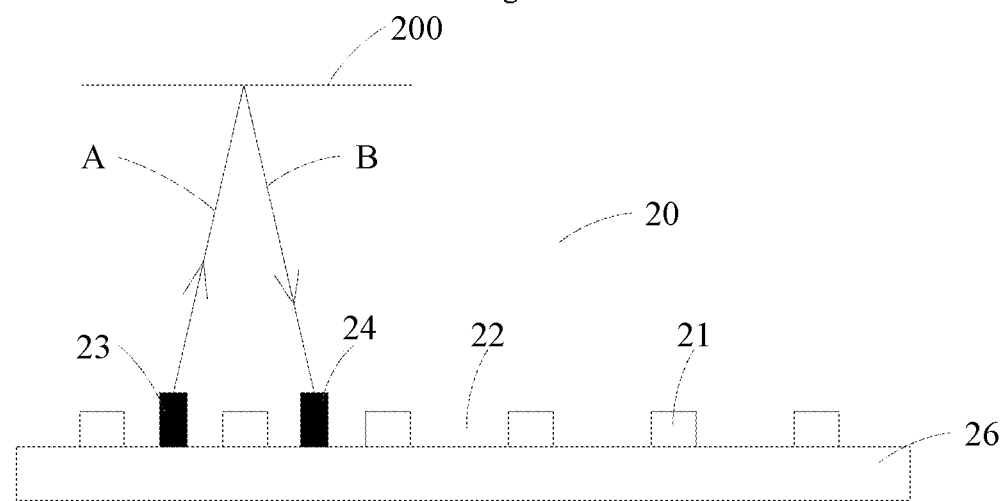
FIG. 3 is a sectional view of the display screen illustrated in FIG. 2 along direction P-P.

FIG. 2 is a first schematic view of the display screen 20 of the electronic device 100 illustrated in FIG. 1, and FIG. 3 is a sectional view of the display screen 20 illustrated in FIG. 2 along direction P-P.

In some embodiments, as illustrated in FIGS. 2 and 3, the display screen 20 includes multiple pixel points 21. Each pixel point 21 may be used to independently display information, such as a part of an image or a text. The pixel points 21 are spaced apart from one another, so as to provide a gap area 22 between the pixel points 21. In some embodiments, the pixel points 21 are arranged in matrix in the display screen 20.

The gap area 22 is provided with a signal emitter 23 and a signal receiver 24 therein. The signal emitter 23 and the signal receiver 24 are spaced apart from each other. As illustrated in FIG. 3, the signal emitter 23 emits a detecting signal A to outside. The detecting signal A is reflected into a reflected signal B when touching an external object 200. The signal receiver 24 receives the reflected signal B.

Both the signal emitter 23 and the signal receiver 24 are electrically coupled to the circuit board 30 of the electronic device 100. After receiving the reflected signal B, the signal receiver 24 outputs the received signal to the processor of the circuit board 30. Then, the electronic device 100 can control the display screen 20 to light up or go out according to an intensity of the signal.

For example, the electronic device 100 may have a signal intensity threshold. When the intensity of the single received by the signal receiver 24 is larger than the signal intensity threshold, it indicates that the electronic device 100 approaches the external object 200 (such as a user's face), and in this case, the electronic device 100 controls the display screen 20 to go out. When the intensity of the signal received by the signal receiver 24 is less than the signal intensity threshold, it indicates that the electronic device 100 moves away from the external object 200, and in this case, the electronic device 100 controls the display screen 20 to light up.

In embodiments of the present disclosure, since the signal emitter 23 and the signal receiver 24 are provided in the gap area 22 between the pixel points 21, i.e. the signal emitter 23 and the signal receiver 24 are arranged in the display area of the display screen 20, the signal emitter 23 and the signal receiver 24 will not occupy the non-display area of the display screen 20 anymore, thus reducing a size of the non-display area in the display screen 20, and hence improving a screen-to-body ratio of the display screen 20.

In some embodiments, as illustrated in FIG. 2, the signal emitter 23 and the signal receiver 24 are arranged at two sides of the pixel point 21 along a transverse direction of the display screen 20. In this case, the signal emitter 23 is spaced apart from the signal receiver 24 by at least one pixel point 21. The pixel point 21 between the signal emitter 23 and the signal receiver 24 can prevent the signal emitted by the signal emitter 23 from diffracting into the signal receiver 24 through an interior of the display screen 20, so as to ensure that the signal received by the signal receiver 24 comes from the reflection of the external object 200 completely, thus improving an accuracy of the electronic device 100 controlling the display screen 20 to light up or go out.

In some embodiments, the signal emitter 23 and the signal receiver 24 may be packaged into a first chip 25.

Figure 4:
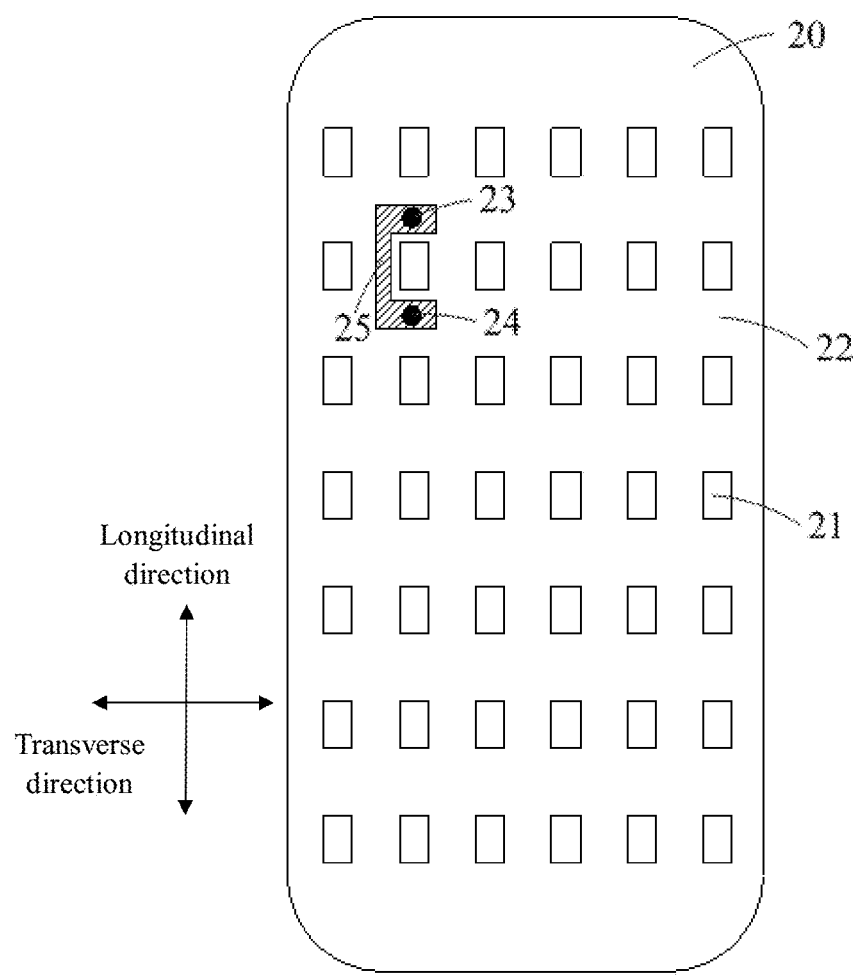
FIG. 4 is a second schematic view of a display screen according to embodiments of the present disclosure.

FIG. 4 is a second schematic view of the display screen 20 of the electronic device 100 illustrated in FIG. 1.

In some embodiments, as illustrated in FIG. 4, the signal emitter 23 and the signal receiver 24 are arranged at two side of the pixel point 21 along a longitudinal direction of the display screen 20. In this case, the signal emitter 23 is spaced apart from the signal receiver 24 by at least one pixel point 21. The pixel point 21 between the signal emitter 23 and the signal receiver 24 can prevent the signal emitted by the signal emitter 23 from diffracting into the signal receiver 24 through an interior of the display screen 20, so as to ensure that the signal received by the signal receiver 24 comes from the reflection of the external object 200 completely, thus improving an accuracy of the electronic device 100 controlling the display screen 20 to light up or go out.

Figure 5:
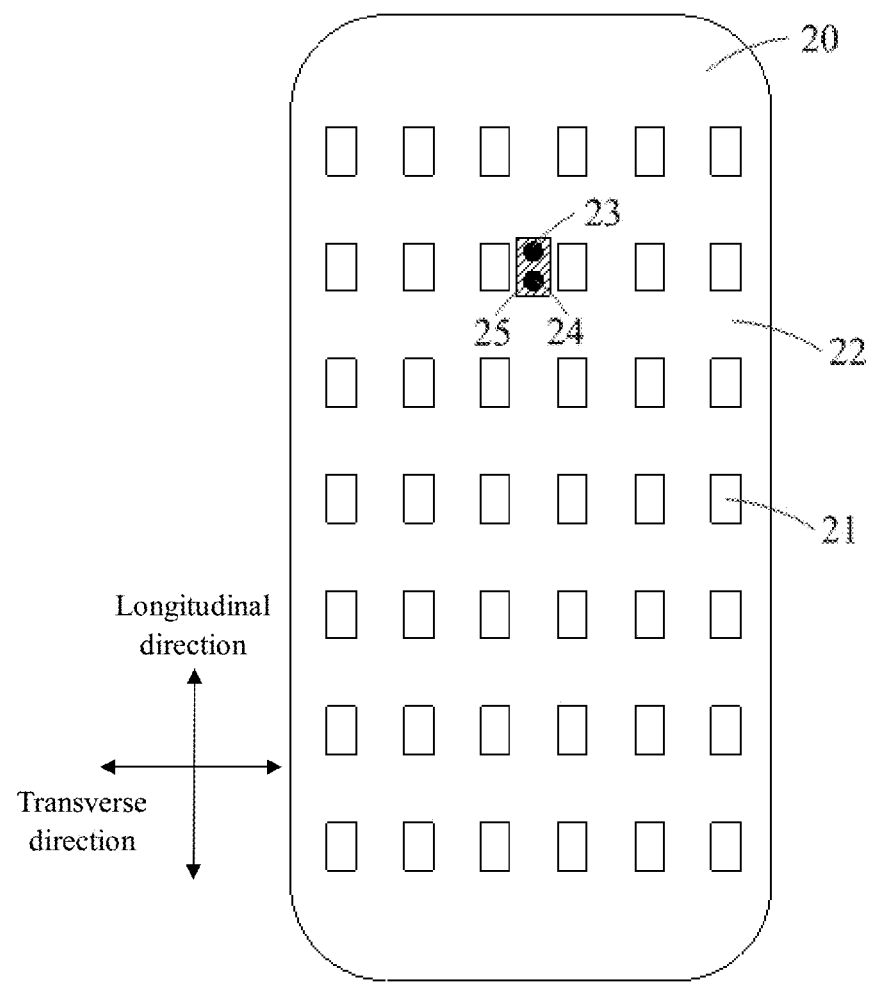
FIG. 5 is a third schematic view of a display screen according to embodiments of the present disclosure.

FIG. 5 is a third schematic view of the display screen 20 of the electronic device 100 illustrated in FIG. 1.

In some embodiments, as illustrated in FIG. 5, the signal emitter 23 and the signal receiver 24 are arranged along the longitudinal direction of the display screen 20. The signal emitter 23 and the signal receiver 24 are spaced apart from each other. No pixel point 21 is provided between the signal emitter 23 and the signal receiver 24, i.e. the signal emitter 23 and the signal receiver 24 do not need to be arranged at two sides of the pixel point 21. Further, the signal emitter 23 and the signal receiver 24 are packaged into the first chip 25. Since no pixel point 21 is arranged between the signal emitter 23 and the signal receiver 24, a size of the first chip 25 is reduced.

Figure 6:
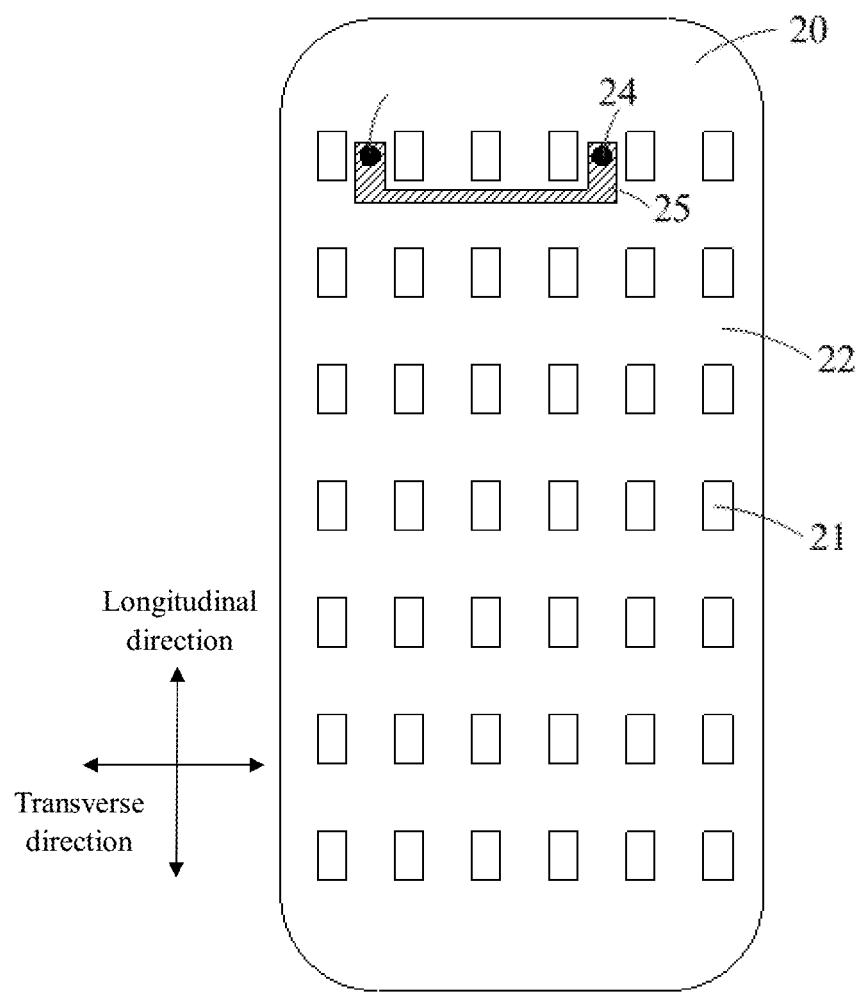
FIG. 6 is a fourth schematic view of a display screen according to embodiments of the present disclosure.

FIG. 6 is a fourth schematic view of the display screen 20 of the electronic device 100 illustrated in FIG. 1.

In some embodiments, as illustrated in FIG. 6, the signal emitter 23 and the signal receiver 24 are arranged at two sides of at least two pixel points 21 along the transverse direction of the display screen 20. In this case, the signal emitter 23 is spaced apart from the signal receiver 24 by at least two pixel points 21. For example, the signal emitter 23 may be spaced apart from the signal receiver 24 by three pixel points 21. The pixel points 21 between the signal emitter 23 and the signal receiver 24 can further block the diffracting signal between the signal emitter 23 and the signal receiver 24, so as to provide a great isolation effect between the signal emitter 23 and the signal receiver 24, and also to ensure that the signal received by the signal receiver 24 comes from the reflection of the external object 200 completely, thus improving an accuracy of the electronic device 100 controlling the display screen 20 to light up or go out.

In some embodiments, the signal emitter 23 may be an infrared light-emitting diode, and the signal receiver 24 may be an infrared receiver. The infrared light emitted by the infrared light-emitting diode may pass through the display screen 20, so as to touch the external object. Thus, the electronic device 100 can detect the approach and departure between itself and the external object.

In some embodiments, the signal emitter 23 may be an ultrasonic emitter, and the signal receiver 24 may be an ultrasonic receiver. The ultrasonic emitted by the ultrasonic emitter may pass through the display screen 20, so as to touch the external object. Thus, the electronic device 100 can detect the approach and departure between itself and the external object.

Figure 7:
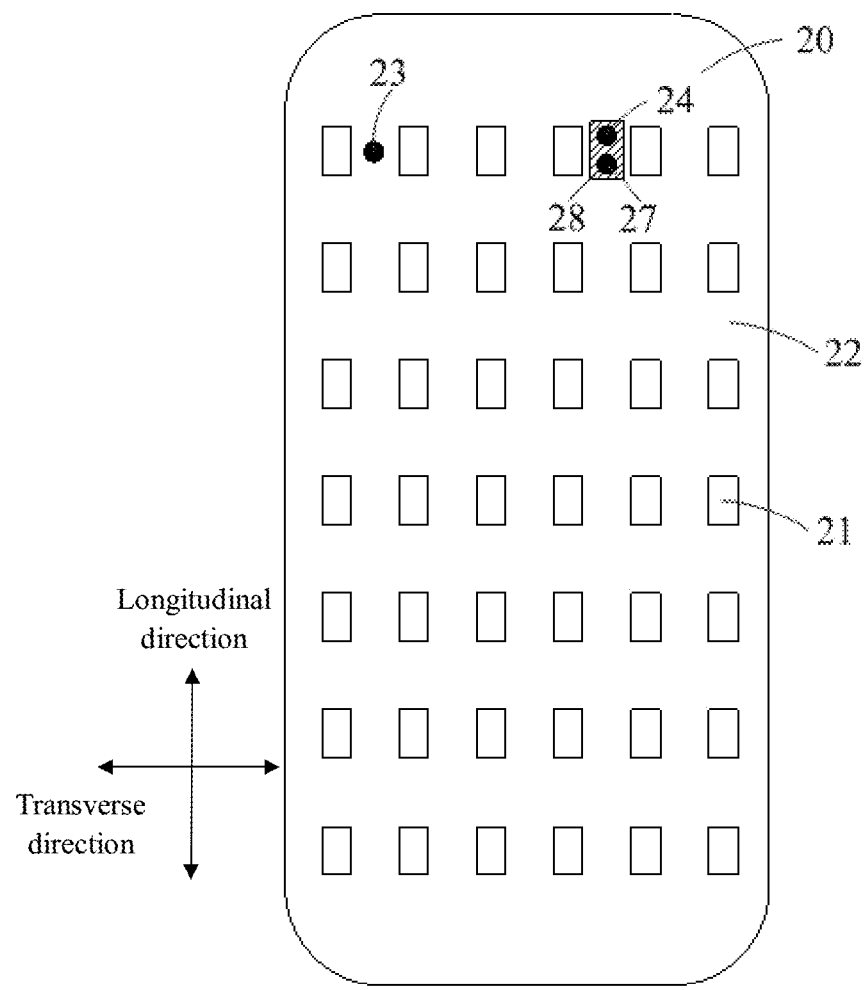
FIG. 7 is a fifth schematic view of a display screen according to embodiments of the present disclosure.

FIG. 7 is a fifth schematic view of the display screen 20 of the electronic device 100 illustrated in FIG. 1.

In some embodiments, as illustrated in FIG. 7, the display screen 20 includes multiple pixel points 21. Each pixel point 21 may independently display information, such as a part of an image or a text. The pixel points 21 are spaced apart from one another, so as to provide a gap area 22 between the pixel points 21. In some embodiments, the pixel points 21 are arranged in matrix in the display screen 20.

The gap area 22 is provided with the signal emitter 23, the signal receiver 24 and the ambient-light sensor 27 therein. The signal emitter 23, the signal receiver 24 and the ambient-light sensor 27 are spaced apart from one another. The signal emitter 23 is used to emit the detecting signal to outside. The detecting signal is reflected into the reflected signal when touching the external object. The signal receiver 24 is used to receive the reflected signal. The ambient-light sensor 27 is used to detect an ambient light intensity.

Both the signal emitter 23 and the signal receiver 24 are electrically coupled to the circuit board 30 of the electronic device 100. After receiving the reflected signal, the signal receiver 24 outputs the received signal to the processor of the circuit board 30. Then, the electronic device 100 controls the display screen 20 to light up or go out according to the intensity of the signal.

The ambient-light sensor 27 is also electrically coupled to the circuit board 30 of the electronic device 100. After detecting the ambient light intensity, the ambient-light sensor 27 outputs the detected ambient light intensity to the processor of the circuit board 30. Then, the electronic device 100 can control the brightness of the display screen 20 according to the ambient light intensity. For example, when the ambient light has a low brightness, the electronic device 100 decreases the brightness of the display screen 20; when the ambient light has a high brightness, the electronic device 100 increases the brightness of the display screen 20.

In some embodiments, the signal receiver 24 and the ambient-light sensor 27 are packaged into a second chip 28.

Figure 8:
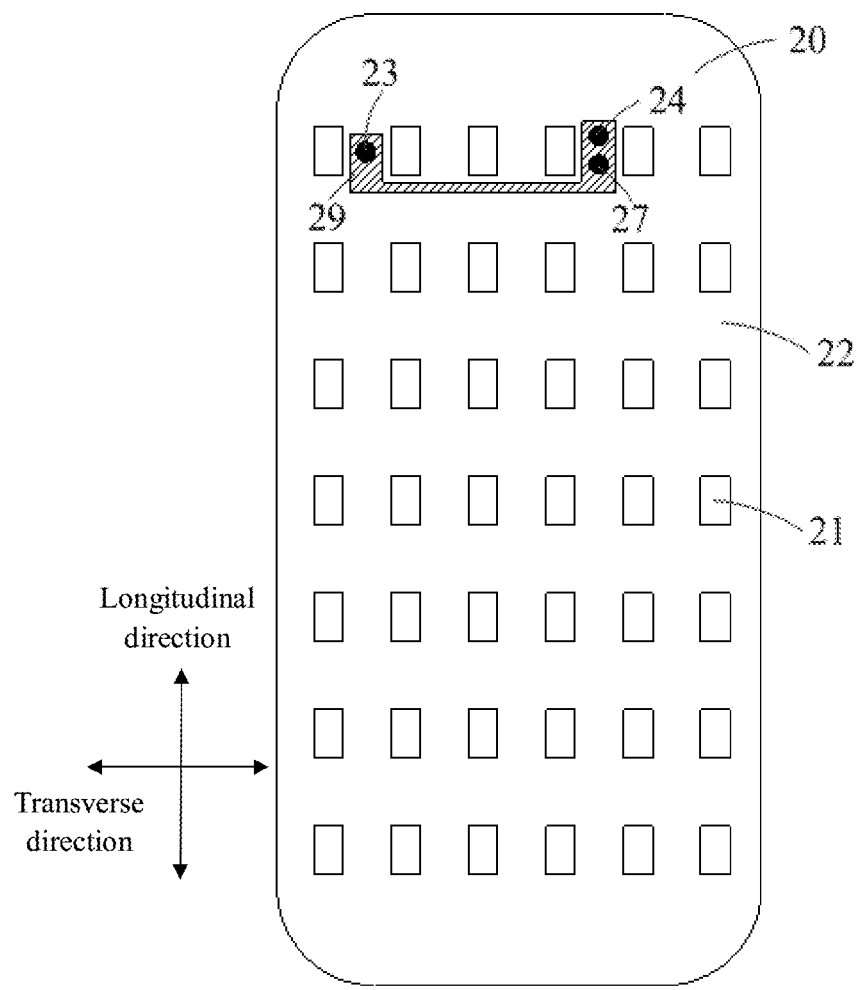
FIG. 8 is a sixth schematic view of a display screen according to embodiments of the present disclosure.

FIG. 8 is a sixth schematic view of the display screen 20 of the electronic device 100 illustrated in FIG. 1. In some embodiments, as illustrated in FIG. 8, the signal emitter 23, the signal receiver 24 and the ambient-light sensor 27 are packaged into a third chip 29.

In some embodiments, the circuit board 30 of the electronic device 100 is provided with a sensor control circuit. The sensor control circuit controls the signal emitter 23 to emit the detecting signal to the outside. In some embodiments, the circuit board 30 may control the signal emitter 23 to emit the detecting signal with different power according to a state of the display screen 20.

For example, the electronic device 100 may detect the state of the display screen 20 in real time. When the display screen 20 has lighted up, the circuit board 30 controls the signal emitter 23 to emit the detecting signal with a first power; when the display screen 20 has gone out, the circuit board 30 controls the signal emitter 23 to emit the detecting signal with a second power. The first power is larger than the second power. Because the display screen 20 is displaying information when the display screen 20 has lighted up, and the display screen 20 may have a certain effect on the signal emitter 23. In this case, the signal emitter 23 emits the detecting signal with a relative large power. Thus, it is ensured that the reflected signal received by the signal receiver 24 when the display screen 20 has lighted up is consistent with the reflected signal received by the signal receiver 24 when the display screen 20 has gone out, thereby ensuring the accuracy of the electronic device 100 controlling the display screen 20 to light up or go out.

In some embodiments, the display screen 20 may not include the non-display area. That is, the display screen 20 has a full-screen display.

Embodiments of the present disclosure provide a display screen. The display screen includes a functional area. The functional area is configured to accommodate a functional component therein and includes multiple pixel points. The pixel points define a gap area therebetween. The display screen further includes a signal emitter received in the gap area.

Figure 9:
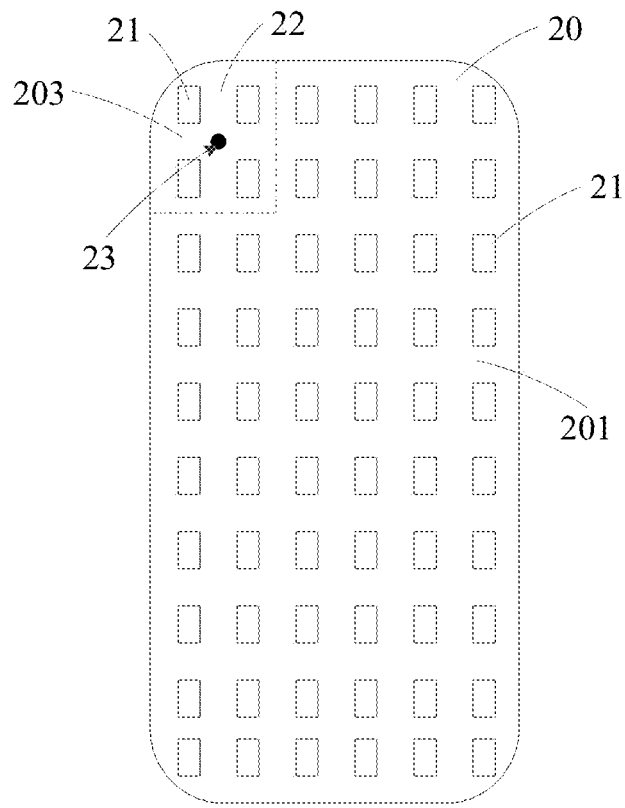
FIG. 9 is a seventh schematic view of a display screen according to embodiments of the present disclosure.

FIG. 9 is a seventh schematic view of the display screen 20 of the electronic device 100 illustrated in FIG. 1.

As illustrated in FIG. 9, the display screen 20 includes a functional area 203 and a display area 201. The display area 201 is used to display information such as images and texts. On one hand, the functional area 203 serves as a part of the display screen 20, for displaying information; on the other hand, the functional area 203 may be integrated with the functional component such as the sensor, such that the functional area 203 allows the functional component to achieve its function, for example, allowing the sensor to collect data.

The functional area 203 and the display area 201 each include multiple pixel points 21. The pixel points 21 in the functional area 203 are arranged in matrix, and the pixel points 21 in the display area 201 are also arranged in matrix. The pixel points 21 in the functional area 203 define a gap area 22 therebetween.

The gap area 22 is provided with the signal emitter 23 therein. The signal emitter 23 is used to emit the detecting signal. The detecting signal may be the infrared light or the ultrasonic. That is, the signal emitter 23 may be the infrared light emitter or the ultrasonic emitter.

Figure 10:
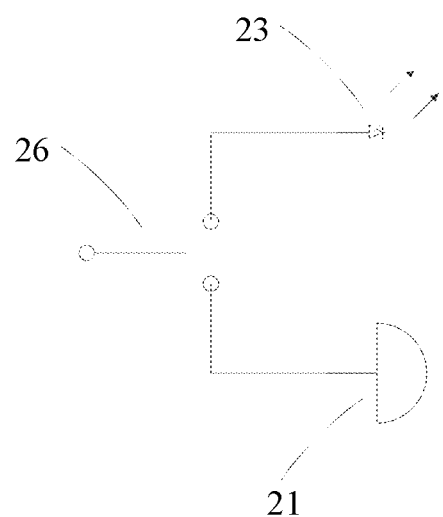
FIG. 10 is a schematic view illustrating a circuit connection in the display screen illustrated in FIG. 9.

FIG. 10 is a schematic view illustrating a circuit connection in the display screen 20 illustrated in FIG. 9.

Also as illustrated in FIG. 10, the display screen 20 further includes a switch 26. The switch 26 is coupled to the signal emitter 23 and at least one of the pixel points 21 in the functional area 203 respectively.

In some embodiments, the switch 26 includes a thin film transistor (TFT). The thin film transistor can achieve a high-frequency switching. The thin film transistor may be arranged in the gap area 22.

It should be noted that, the coupling between the switch 26 and the signal emitter 23 as well as the coupling between the switch 26 and the pixel point 21 just mean a physical connection, but not an electrical communication. In other words, even though the switch 26 is connected with the signal emitter 23, the switch 26 may be electrically communicated with the signal emitter 23 or not. Similarly, even though the switch 26 is connected with the pixel point 21, the switch 26 may be electrically communicated with the pixel point 21 or not.

When receiving a first drive signal, the switch 26 turns on the signal emitter 23 and turns off the pixel point 21. When receiving a second drive signal, the switch 26 turns on the pixel point 21 and turns off the signal emitter 23. The first drive signal may be an electrical signal for driving the signal emitter 23 to operate, and the second drive signal may be an electrical signal for driving the pixel point 21 to operate.

Thus, the display area 201 of the display screen 20 can display information normally. When the signal emitter 23 does not operate, the functional area 203 displays information normally. When the signal emitter 23 operates, the at least one pixel point 21 (i.e. the pixel point coupled to the switch 26) in the functional area 203 does not operate, i.e. not performing a display function. Thus, when the signal emitter 23 operates, the brightness of the functional area 203 is less than the brightness of the display area 201, such that the effect of the functional area 203 on the signal emitter 23 is reduced while the functional area 203 performs the display function.

In some embodiments, the switch 26 may be achieved by an integrated circuit in the display screen 20. The integrated circuit may be the display control circuit at a bottom of the display screen.

In embodiments of the present disclosure, since the signal emitter 23 is integrated into the display screen 20, there is no need to provide a separate non-display area for the signal emitter 23 in the display screen 20, and thus the screen-to-body ratio of the display screen 20 is increased. Also, under control of the switch 26, the effect of the display screen 20 on the signal emitter 23 when the display screen 20 displays information can be reduced, thus ensuring the normal operation of the signal emitter 23.

Figure 11:
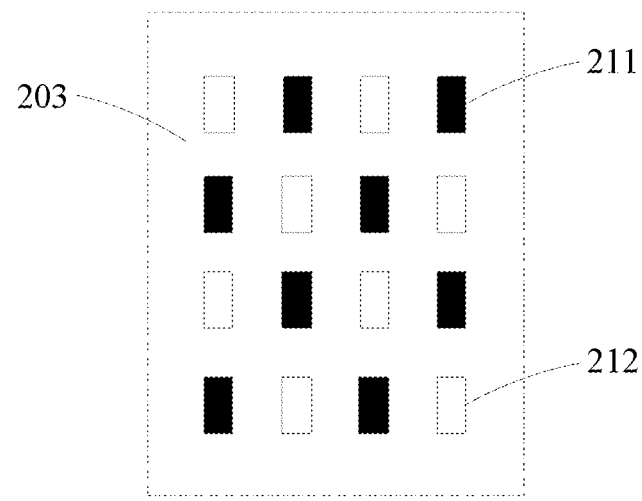
FIG. 11 is a partial schematic view of a functional area of the display screen illustrated in FIG. 9.

FIG. 11 is a partial schematic view of the functional area 203 of the display screen 20 illustrated in FIG. 9.

In some embodiments, as illustrated in FIG. 11, the pixel points in the functional area 203 include a first group 211 of pixel points and a second group 212 of pixel points. The first group 211 of pixel points are spaced apart from the second group 212 of pixel points. The switch 26 is coupled to the signal emitter 23 and the first group 211 of pixel points.

In some embodiments, the first group 211 of pixel points alternate with the second group 212 of pixel points.

In some embodiments, the number of the pixel points in the first group 211 of pixel points is equal to the number of the pixel points in the second group 212 of pixel points. In this case, when the signal emitter 23 does not operate, all the pixel points in the functional area 203 perform the display function; when the signal emitter 23 operates, only a half of the pixel points in the functional area 203 perform the display function.

Figure 12:
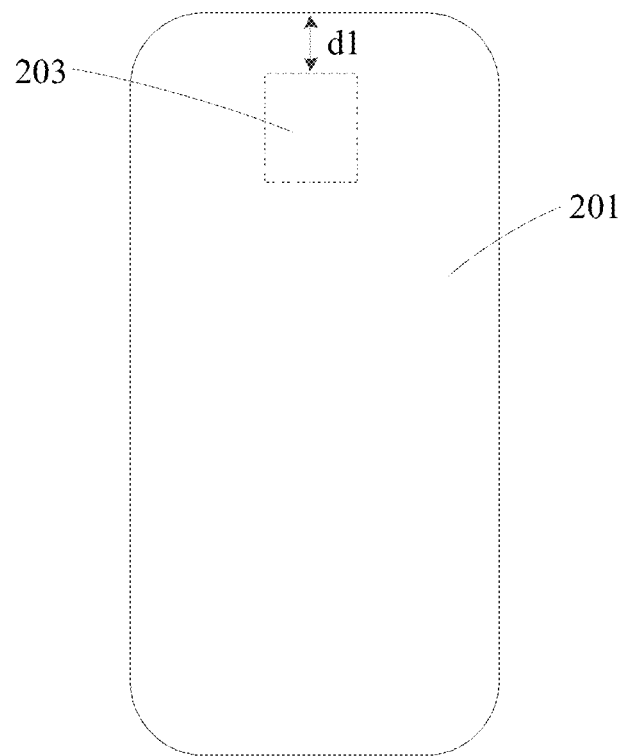
FIG. 12 is an eighth schematic view of a display screen according to embodiments of the present disclosure.

FIG. 12 is an eighth schematic view of the display screen 20 of the electronic device 100 illustrated in FIG. 1.

In some embodiments, as illustrated in FIG. 12, the functional area 203 is arranged within in the display area 201. In some embodiments, the functional area 203 is arranged close to an edge of the display area 201. In some embodiments, a minimum distance dl from the functional area 203 to the edge of the display area 201 is less than a predetermined distance. For example, the predetermined distance is 10 millimeters, and then the minimum distance dl from the functional area 203 to the edge of the display area 201 is less than 10 millimeters.

Figure 13:
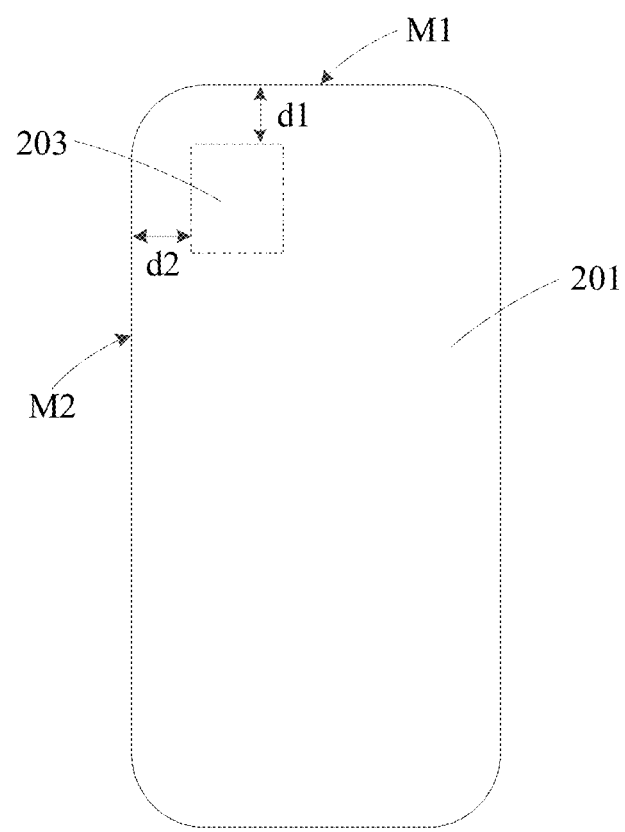
FIG. 13 is a ninth schematic view of a display screen according to embodiments of the present disclosure.

FIG. 13 is a ninth schematic view of the display screen 20 of the electronic device 100 illustrated in FIG. 1.

In some embodiments, as illustrated in FIG. 13, the functional area 203 is arranged close to a corner of the display area 201. In some embodiments, the display area 201 has a first edge M1 and a second edge M2. The first edge M1 is perpendicular to the second edge M2. A minimum distance from the functional area 203 to the first edge M1 and a minimum distance from the functional area 203 to the second edge M2 both are less than the predetermined distance. For example, the predetermined distance is 10 millimeters, the minimum distance from the functional area 203 to the first edge M1 and the minimum distance from the functional area 203 to the second edge M2 both are less than 10 millimeters.

Figure 14:
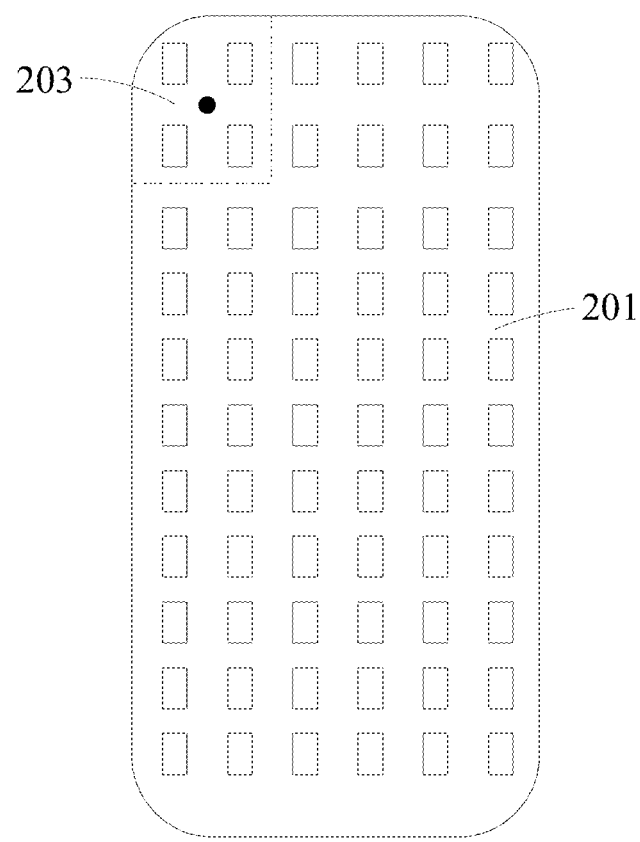
FIG. 14 is a tenth schematic view of a display screen according to embodiments of the present disclosure.

FIG. 14 is a tenth schematic view of the display screen 20 of the electronic device 100 illustrated in FIG. 1.

In some embodiments, as illustrated in FIG. 14, a density of the pixel points in the display area 201 is larger than a density of the pixel points in the functional area 203. That is, in a same area, the display area 201 includes more pixel points than the functional area 203.

Figure 15:
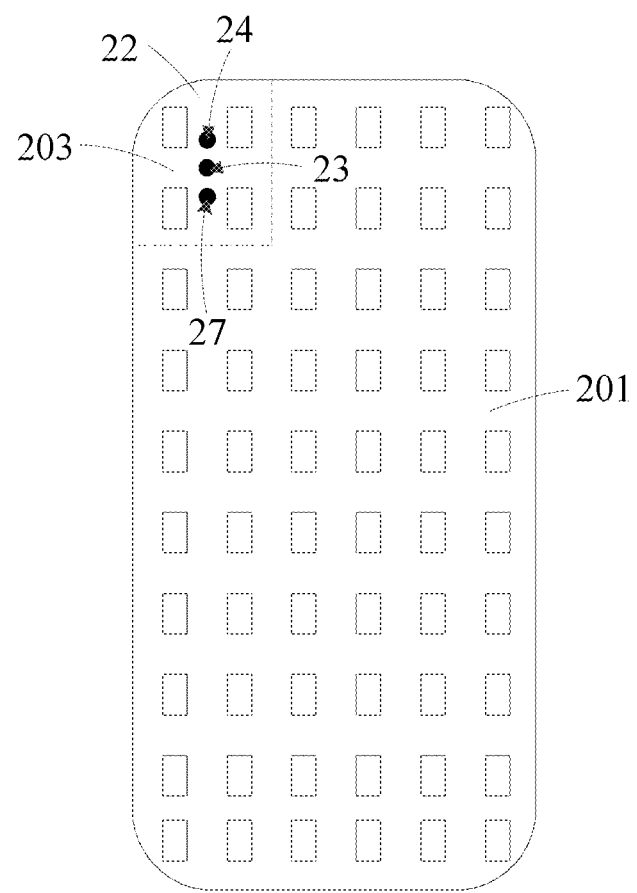
FIG. 15 is an eleventh schematic view of a display screen according to embodiments of the present disclosure.

FIG. 15 is an eleventh schematic view of the display screen 20 of the electronic device 100 illustrated in FIG. 1.

In some embodiments, as illustrated in FIG. 15, the gap area 22 is further provided with the signal receiver 24 therein. The signal receiver 24 is spaced apart from the signal emitter 23. The detecting signal emitted by the signal emitter 23 is reflected by the external object (such as the user's face) into the reflected signal. The signal receiver 24 is used to receive the reflected signal. The electronic device 100 may determine the distance between the electronic device 100 and the external object (such as the user's face) according to the intensity of the reflected signal received by the signal receiver 24, so as to control the display screen 20 to light up or go out. That is, the signal emitter 23 and the signal receiver 24 can achieve the function of a proximity sensor.

In some embodiments, a distance between a center of the signal emitter 23 and a center of the signal receiver 24 ranges from 2 millimeters to 14 millimeters. For example, the distance between the center of the signal emitter 23 and the center of the signal receiver 24 is 4 millimeters.

In some embodiments, as illustrated in FIG. 15, the gap area 22 is further provided with the ambient-light sensor 27 therein. The ambient-light sensor 27 is spaced apart from the signal emitter 23 and the signal receiver 24. The ambient-light sensor 27 is used to detect the ambient light intensity. The electronic device 100 may adjust the brightness of the display screen 20 according to the ambient light intensity detected by the ambient-light sensor 27.

The above is the detailed introduction of the display screen and the electronic device according to embodiments of the present disclosure, the principle and the implementation mode of the present disclosure are elaborated by means of specific examples, and the illustration for the above embodiments are merely used to understand the present disclosure. Meanwhile, the specific embodiments and the applied ranges can be changed for those skilled in the art according to the concept of the present disclosure. In general, the content of the present specification should not be construed to limit the present disclosure.

What is claimed is:

1. A display screen for an electronic device, comprising:
a functional area configured to achieve a function of the electronic device and comprising a plurality of pixel points, the plurality of pixel points defining a gap area therebetween;
a signal emitter received in the gap area; and
a display area, the display area is configured to display information, and the functional area is arranged within the display area;
wherein the display area includes a plurality of pixel points, and a density of the pixel points in the display area is larger than a density of the pixel points in the functional area;
wherein the plurality of pixel points includes a first group of pixel points and a second group of pixel points, and the first group of pixel points are spaced apart from the second group of pixel points;
wherein the display screen further includes a switch coupled to the signal emitter and the first group of pixel points.

2. The display screen according to claim 1, wherein the switch is configured to turn on the signal emitter and turn off the first group of pixel points when receiving a first drive signal, and the switch is further configured to turn on the first group of pixel points and turn off the signal emitter when receiving a second drive signal.

3. The display screen according to claim 2, wherein the first group of pixel points alternate with the second group of pixel points.

4. The display screen according to claim 1, wherein the functional area has a minimum distance less than 10 millimeters from an edge of the display area.

5. The display screen according to claim 1, wherein the display area has a first edge and a second edge, and the first edge is perpendicular to the second edge;
a minimum distance from the functional area to the first edge and another minimum distance from the functional area to the second edge both are less than 10 millimeters.

6. The display screen according to claim 1, wherein the gap area is further provided with a signal receiver therein, the signal receiver is spaced apart from the signal emitter, the signal emitter is configured to emit a detecting signal and the signal receiver is configured to receive a reflected signal generated by the detecting signal being reflected by an external object.

7. The display screen according to claim 6, wherein the gap area is further provided with an ambient-light sensor therein, the ambient-light sensor is spaced apart from the signal emitter and the signal receiver, and the ambient-light sensor is configured to detect an ambient light intensity.

8. An electronic device, comprising:
a housing; and
a display screen being coupled to the housing;
wherein the display screen comprises a plurality of pixel points, the plurality of pixel points defining a gap area therebetween, and the gap area being provided with a signal emitter therein;

wherein the display screen further comprises a switch coupled to the signal emitter and at least one of the plurality of pixel points;

wherein the display screen further comprises a signal receiver positioned in the gap area, spaced apart from the signal emitter and communicated with the signal emitter;

wherein the signal emitter and the signal receiver are arranged at two opposite sides of one of the plurality of pixel points.

9. The electronic device according to claim 8, further comprising a circuit board, the circuit board being received in the housing, being electrically coupled to the display screen, and being configured to control the signal emitter to emit a detecting signal.

10. A display screen, comprising:
a display area having a plurality of pixel points, the plurality of pixel points being spaced apart from one another so as to define a gap area therebetween;
a signal emitter and a signal receiver positioned in the gap area, the signal receiver being spaced apart from the signal emitter and communicated with the signal emitter; and
an ambient-light sensor spaced apart from the signal emitter and the signal receiver, the ambient-light sensor being configured to detect an ambient light intensity.

11. The display screen according claim 10, wherein the signal emitter and the signal receiver are packaged into a first chip.

12. The display screen according claim 10, wherein the signal receiver and the ambient-light sensor are packaged into a second chip.

13. The display screen according claim 10, wherein the signal emitter, the signal receiver and the ambient-light sensor are packaged into a third chip.

14. The display screen according claim 10, wherein the signal emitter and the signal receiver are arranged at two opposite sides of one of the plurality of pixel points.

15. The display screen according claim 10, wherein the signal emitter and the signal receiver are arranged in a line, and no pixel point is arranged between the signal emitter and the signal receiver.

* * * * *